United States Patent
Esterberg et al.

(10) Patent No.: US 7,419,096 B2
(45) Date of Patent: Sep. 2, 2008

(54) RFID JOINT ACQUISITION OF TIME SYNC AND TIMEBASE

(75) Inventors: Aanand Esterberg, Seattle, WA (US); William T. Colleran, Seattle, WA (US); Scott Anthony Cooper, Seattle, WA (US)

(73) Assignee: Impinj, Inc., Seattle, WA (US)

( * ) Notice: Subject to any disclaimer, the term of this patent is extended or adjusted under 35 U.S.C. 154(b) by 620 days.

(21) Appl. No.: 11/136,948

(22) Filed: May 24, 2005

(65) Prior Publication Data

US 2005/0269408 A1 Dec. 8, 2005

Related U.S. Application Data

(63) Continuation-in-part of application No. 10/861,073, filed on Jun. 4, 2004.

(60) Provisional application No. 60/602,981, filed on Aug. 19, 2004.

(51) Int. Cl.
*G06K 7/08* (2006.01)
*G06K 19/00* (2006.01)
*G06K 19/06* (2006.01)
*H04Q 5/22* (2006.01)
*G08B 13/14* (2006.01)

(52) U.S. Cl. .................. 235/451; 235/435; 235/487; 235/492; 235/493; 340/572.1; 340/572.2; 340/10.1

(58) Field of Classification Search .............. 340/572.1, 340/572.2, 10.1; 235/435, 451, 487, 492, 235/493
See application file for complete search history.

(56) References Cited

U.S. PATENT DOCUMENTS

| | | | | |
|---|---|---|---|---|
| 4,401,987 A | * | 8/1983 | Cyr | 342/93 |
| 4,910,521 A | * | 3/1990 | Mellon | 342/45 |
| 5,017,930 A | * | 5/1991 | Stoltz et al. | 342/465 |
| 5,675,342 A | * | 10/1997 | Sharpe | 340/10.2 |
| 6,107,910 A | * | 8/2000 | Nysen | 340/10.1 |
| 6,590,881 B1 | * | 7/2003 | Wallace et al. | 370/332 |
| 7,023,323 B1 | * | 4/2006 | Nysen | 340/10.1 |
| 7,023,342 B2 | * | 4/2006 | Corbett et al. | 340/572.1 |

(Continued)

OTHER PUBLICATIONS

Pete Sorrells, Microchip Technology Inc., Passive RFID Basics, 1998, pp. 1-5.

(Continued)

*Primary Examiner*—Daniel Walsh
(74) *Attorney, Agent, or Firm*—Adorno & Yoss, LLC; Carl K. Turk

(57) ABSTRACT

Systems and methods to determine timebase and timing (i.e., time sync) of received signals in RFID systems. Multiple matched filters corresponding to multiple timebases are used to receive the preambles of signals received from RFID tags. The multiple matched filters define a range of expected timebases of the received signals. The matched filter with the maximum output signal peak is used to derive the timebase and timing of the received signal. Viterbi techniques can be used in determining the timebase and timing to incorporate a portion of the data signal in addition to the preamble. Reconfigurable matched filters can be used so that after a preliminary timebase is determined as described above, the matched filters can be reconfigured to define a new smaller range centered about the preliminary timebase. This allows the timebase to be determined with finer resolution when another preamble portion is received.

20 Claims, 11 Drawing Sheets

U.S. PATENT DOCUMENTS

| | | | |
|---|---|---|---|
| 7,026,935 B2* | 4/2006 | Diorio et al. | 340/572.2 |
| 7,054,281 B2* | 5/2006 | McNeely | 370/316 |
| 2003/0021365 A1* | 1/2003 | Min et al. | 375/343 |
| 2003/0179123 A1* | 9/2003 | DeVilbiss | 341/157 |
| 2005/0057368 A1* | 3/2005 | Corbett et al. | 340/825.49 |
| 2005/0099270 A1* | 5/2005 | Diorio et al. | 340/10.51 |
| 2005/0237160 A1* | 10/2005 | Nolan et al. | 340/10.33 |
| 2005/0237162 A1* | 10/2005 | Hyde et al. | 340/10.51 |
| 2005/0269408 A1* | 12/2005 | Esterberg et al. | 235/435 |
| 2005/0270185 A1* | 12/2005 | Esterberg | 341/50 |
| 2005/0286660 A1* | 12/2005 | Nysen et al. | 375/343 |
| 2006/0022815 A1* | 2/2006 | Fischer et al. | 340/505 |
| 2006/0049946 A1* | 3/2006 | Sullivan et al. | 340/572.2 |
| 2006/0125553 A1* | 6/2006 | Enguent | 329/347 |
| 2006/0160515 A1* | 7/2006 | Wong | 455/280 |
| 2006/0181395 A1* | 8/2006 | Gruszynski | 340/10.51 |
| 2006/0238301 A1* | 10/2006 | Wu et al. | 340/10.1 |
| 2006/0289649 A1* | 12/2006 | Sugiura et al. | 235/451 |
| 2007/0109129 A1* | 5/2007 | Sundstrom et al. | 340/572.2 |
| 2007/0152073 A1* | 7/2007 | Esterberg | 235/492 |
| 2008/0012710 A1* | 1/2008 | Sadr | 340/572.1 |
| 2008/0046492 A1* | 2/2008 | Sundstrom | 708/200 |

OTHER PUBLICATIONS

Signal Processing & Simulation Newsletter, Oct. 9, 2000, pp. 1-12.
Signal Processing & Simulation Newsletter, Oct. 16, 2000, pp. 1-19.
Andrew Bateman, Transmitter & Receiver Architectures, downloaded Jun. 14, 2004, pp. 1-22.
TI-RFID Product Manuals Terms & Abbreviations by Texas Instruments Incorporated, Nov. 2001, pp. 1-14.

* cited by examiner

RFID JOINT ACQUISITION OF TIME SYNC AND TIMEBASE

CROSS-REFERENCE TO RELATED APPLICATIONS

This application is a continuation-in-part of U.S. patent application Ser. No. 10/861,073 entitled "Decoding With Memory in RFID System" by Aanand Esterberg, filed Jun. 4, 2004 and incorporated herein by reference in its entirety.

In addition, this application claims benefit of U.S. Provisional Application No. 60/602,981 entitled "RFID Joint Acquisition of Time Synchronization and Timebase" by Aanand Esterberg et al., filed Aug. 19, 2004.

BACKGROUND

Radio Frequency IDentification (RFID) systems typically include tags and RFID readers, which are also known as RFID reader/writers. RFID systems can be used in many ways for locating and identifying objects to which they are attached. RFID systems are particularly useful in product-related and service-related industries for tracking large numbers of objects being processed, inventoried, or handled. In such cases, an RFID tag is usually attached to an individual item, or to its package.

In principle, RFID techniques entail using a device called an RFID reader to interrogate one or more RFID tags. Interrogation is performed by the reader transmitting a Radio Frequency (RF) wave. A tag that senses the interrogating RF wave responds by transmitting back another RF wave. The tag generates the transmitted back RF wave either originally, or by reflecting back a portion of the interrogating RF wave, a process known as backscatter. Backscatter may take place in a number of ways.

The RF wave returned from a tag may further encode data stored internally in the tag, such as a number. The response, and the data if available, is decoded by the reader, which thereby identifies, counts, or otherwise interacts with the associated item. The data can denote a serial number, a price, a date, a destination, other attribute(s), any combination of attributes, and so on.

An RFID tag typically includes an antenna system, a power management section, a radio section, and frequently a logical section, a memory, or both. In earlier RFID tags, the power management section included a power storage device, such as a battery. RFID tags with a power storage device are known as active tags. Advances in semiconductor technology have miniaturized the electronics so much that an RFID tag can be powered by the RF signal it receives enough to be operated. Such RFID tags do not include a power storage device, and are called passive tags.

In some RFID readers, matched filters are used to receive backscatter signals from tags. However, tags may have a relatively large timebase variation (i.e., the frequency of the backscatter signal). This variation can impact the performance of the reader's matched filter in receiving data from the tags.

SUMMARY

Various embodiments have aspects directed toward systems and methods to determine timebase and timing (i.e., time sync) of received signals in RFID systems. According to one aspect, multiple preamble matched filters corresponding to multiple timebases are used to receive the preambles of signals received from RFID tags. Magnitude detectors can be used to detect peaks in the output signals of the preamble matched filters. The timebase of the preamble matched filter with the maximum output signal peak is used to estimate the timebase of the received signal, and the output signal of the preamble matched filter is used to determine the timing of the received signal. In this context, "timing" refers to the start of the transmitted message or signal.

According to another aspect, Viterbi techniques are used in determining the timebase and timing. Multiple data preamble matched filters are used in addition to the multiple preamble matched filters. Viterbi decoders are used to receive the output signals of the data matched filters. The output signals of the magnitude detectors are combined with the output signals of the corresponding Viterbi decoders so as to form, in effect, an "extended preamble portion", which can improve the accuracy of the timebase and timing determination.

According to another aspect, reconfigurable matched filters are used. Reconfigurable matched filters are used so that after a preliminary timebase is determined as described above, the matched filters can be reconfigured to define a new smaller range centered about the preliminary timebase. In this way, the timebase may be determined with finer resolution when another preamble portion is received.

BRIEF DESCRIPTION OF THE DRAWINGS

Non-limiting and non-exhaustive embodiments are described with reference to the following figures, wherein like reference numerals refer to like parts throughout the various views unless otherwise specified.

DETAILED DESCRIPTION OF ILLUSTRATED EMBODIMENTS

Various embodiments are described more fully below with reference to the accompanying drawings, which form a part hereof, and which show specific exemplary embodiments for practicing the invention. However, embodiments may be implemented in many different forms and should not be construed as limited to the embodiments set forth herein; rather, these embodiments are provided so that this disclosure will be thorough and complete, and will fully convey the scope of the invention to those skilled in the art. Embodiments may be practiced as methods, systems or devices. Accordingly, embodiments may take the form of an entirely hardware implementation, an entirely software implementation or an implementation combining software and hardware aspects. The following detailed description is, therefore, not to be taken in a limiting sense.

Throughout the specification and claims, the following terms take at least the meanings explicitly associated herein, unless the context clearly dictates otherwise. The meanings identified below are not intended to limit the terms, but merely provide illustrative examples for the terms. The meaning of "a," "an," and "the" includes plural reference, the meaning of "in" includes "in" and "on." The term "connected" means a direct electrical connection between the items connected, without any intermediate devices. The term "coupled" means either a direct electrical connection between the items connected or an indirect connection through one or more passive or active intermediary devices. The term "circuit" means either a single component or a multiplicity of components, either active and/or passive, that are coupled together to provide a desired function. The term "signal" means at least one current, voltage, charge, temperature, data, or other measurable quantity. The terms "RFID reader" and "RFID tag" are used interchangeably with the terms "reader" and "tag", respectively, throughout the text and claims. The terms "command size" and "command length" are used interchangeably throughout the text and claims. While this description is mostly in terms of commands, that is only intended as an example, and it is intended to apply also to more generalized words.

Figure 1:
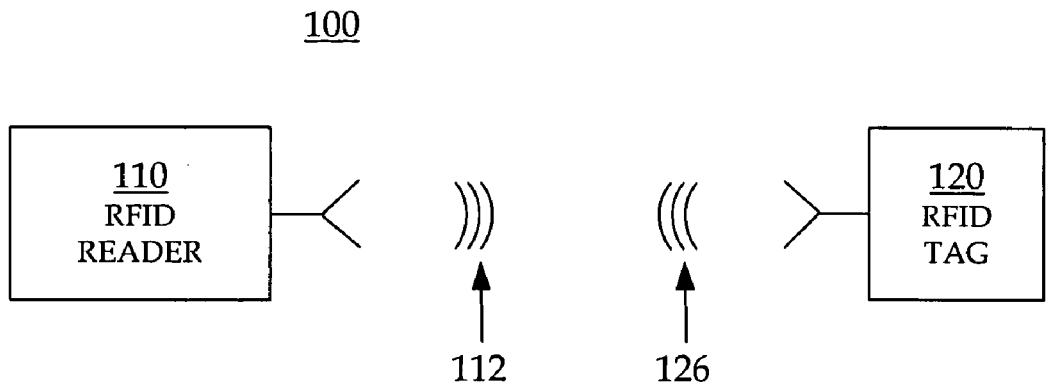
FIG. 1 is a diagram illustrating a typical RFID system with an RFID reader and an RFID tag.

FIG. 1 is a diagram of a typical RFID system 100, incorporating aspects of the invention. An RFID reader 110 transmits an interrogating Radio Frequency (RF) wave 112. RFID tag 120 in the vicinity of RFID reader 110 may sense interrogating RF wave 112, and generate wave 126 in response. RFID reader 110 senses and interprets wave 126.

Reader 110 and tag 120 exchange data via wave 112 and wave 126. In a session of such an exchange, each encodes, modulates, and transmits data to the other, and each receives, demodulates, and decodes data from the other. The data is modulated onto, and decoded from, RF waveforms, as will be seen in more detail below.

Encoding the data can be performed in a number of different ways. For example, protocols are devised to communicate in terms of symbols, also called RFID symbols. A symbol for communicating can be a preamble, a null symbol, and so on. Further symbols can be implemented for exchanging binary data, such as "0" and "1".

Tag 120 can be a passive tag or an active tag, i.e. having its own power source. Where tag 120 is a passive tag, it is powered from wave 112.

Figure 2:
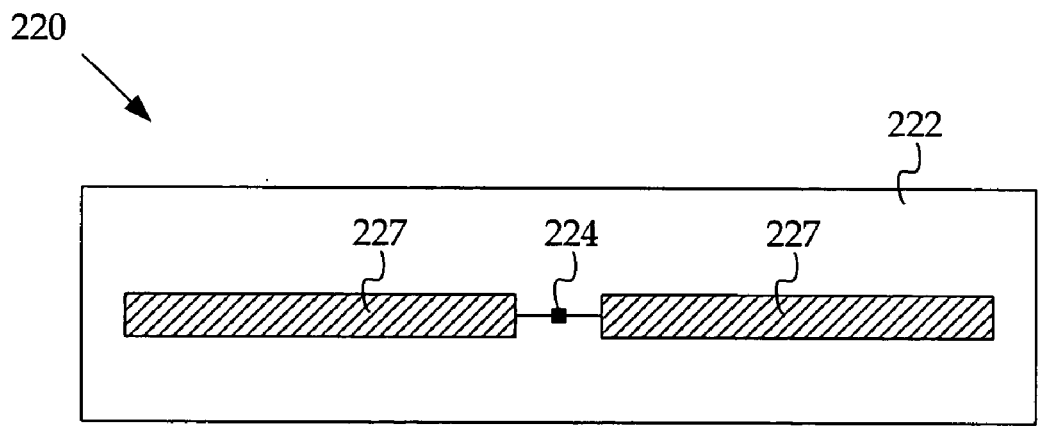
FIG. 2 is a diagram of an RFID tag such as the RFID tag shown in FIG. 1.

FIG. 2 is a diagram of an RFID tag 220. Tag 220 is implemented as a passive tag, meaning it does not have its own power source. Much of what is described in this document, however, applies also to active tags.

Tag 220 is formed on a substantially planar inlay 222, which can be made in many ways known in the art. Tag 220 also includes two antenna segments 227, which are usually flat and attached to inlay 222. Antenna segments 227 are shown here forming a dipole, but many other embodiments using any number of antenna segments are possible.

Tag 220 also includes an electrical circuit, which is preferably implemented in an integrated circuit (IC) 224. IC 224 is also arranged on inlay 222, and electrically coupled to antenna segments 227. Only one method of coupling is shown, while many are possible.

In operation, a signal is received by antenna segments 227, and communicated to IC 224. IC 224 both harvests power, and decides how to reply, if at all. If it has decided to reply, IC 224 modulates the reflectance of antenna segments 227, which generates the backscatter from a wave transmitted by the reader. Coupling together and uncoupling antenna segments 227 can modulate the reflectance, as can a variety of other means.

In the embodiment of FIG. 2, antenna segments 227 are separate from IC 224. In other embodiments, antenna segments may alternately be formed on IC 224, and so on.

The components of the RFID system of FIG. 1 may communicate with each other in any number of modes. One such mode is called full duplex. Another such mode is called half-duplex, and is described below.

Figure 3:
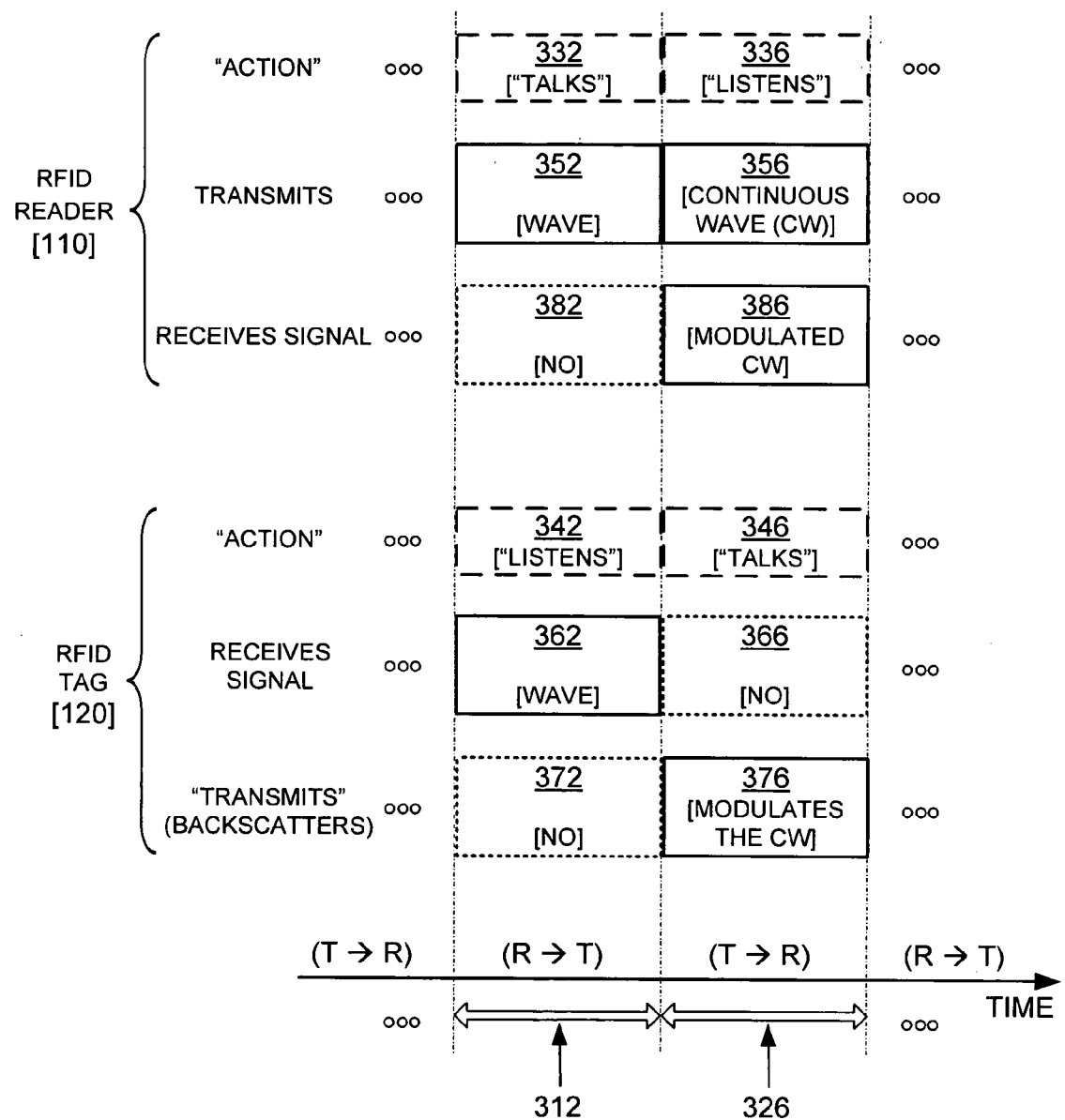
FIG. 3 is a conceptual diagram for explaining a half-duplex mode of communication between the components of the RFID system of FIG. 1, during normal operation in the field.

FIG. 3 is a conceptual diagram 300 for explaining the half-duplex mode of communication between the components of the RFID system of FIG. 1, especially when tag 120 is implemented as passive tag 220 of FIG. 2. The explanation is made with reference to a TIME axis, and also to a human metaphor of "talking" and "listening". The actual technical implementations for "talking" and "listening" are now described.

RFID reader 110 and RFID tag 120 talk and listen to each other by taking turns. As seen on axis TIME, when reader 110 talks to tag 120 the session is designated as "R→T", and when tag 120 talks to reader 110 the session is designated as "T→R". Along the TIME axis, a sample R→T session occurs during a time interval 312, and a following sample T→R session occurs during a time interval 326. Of course intervals 312, 326 can be of different durations—here the durations are shown approximately equal only for purposes of illustration.

According to blocks 332 and 336, RFID reader 110 talks during interval 312, and listens during interval 326. According to blocks 342 and 346, RFID tag 120 listens while reader 110 talks (during interval 312), and talks while reader 110 listens (during interval 326).

In terms of actual technical behavior, during interval 312, reader 110 talks to tag 120 as follows. According to block 352, reader 110 transmits wave 112, which was first described in FIG. 1. At the same time, according to block 362, tag 120 receives wave 112 and processes it. Meanwhile, according to block 372, tag 120 does not backscatter with its antenna, and according to block 382, reader 110 has no wave to receive from tag 120.

During interval 326, tag 120 talks to reader 110 as follows. According to block 356, reader 110 transmits a Continuous Wave (CW), which can be thought of as a carrier signal that ideally encodes no information. As discussed before, this carrier signal serves both to be harvested by tag 120 for its own internal power needs, and also as a wave that tag 120 can backscatter. Indeed, during interval 326, according to block 366, tag 120 does not receive a signal for processing. Instead, according to block 376, tag 120 modulates the CW emitted according to block 356, so as to generate backscatter wave 126. Concurrently, according to block 386, reader 110 receives backscatter wave 126 and processes it.

Figure 4:
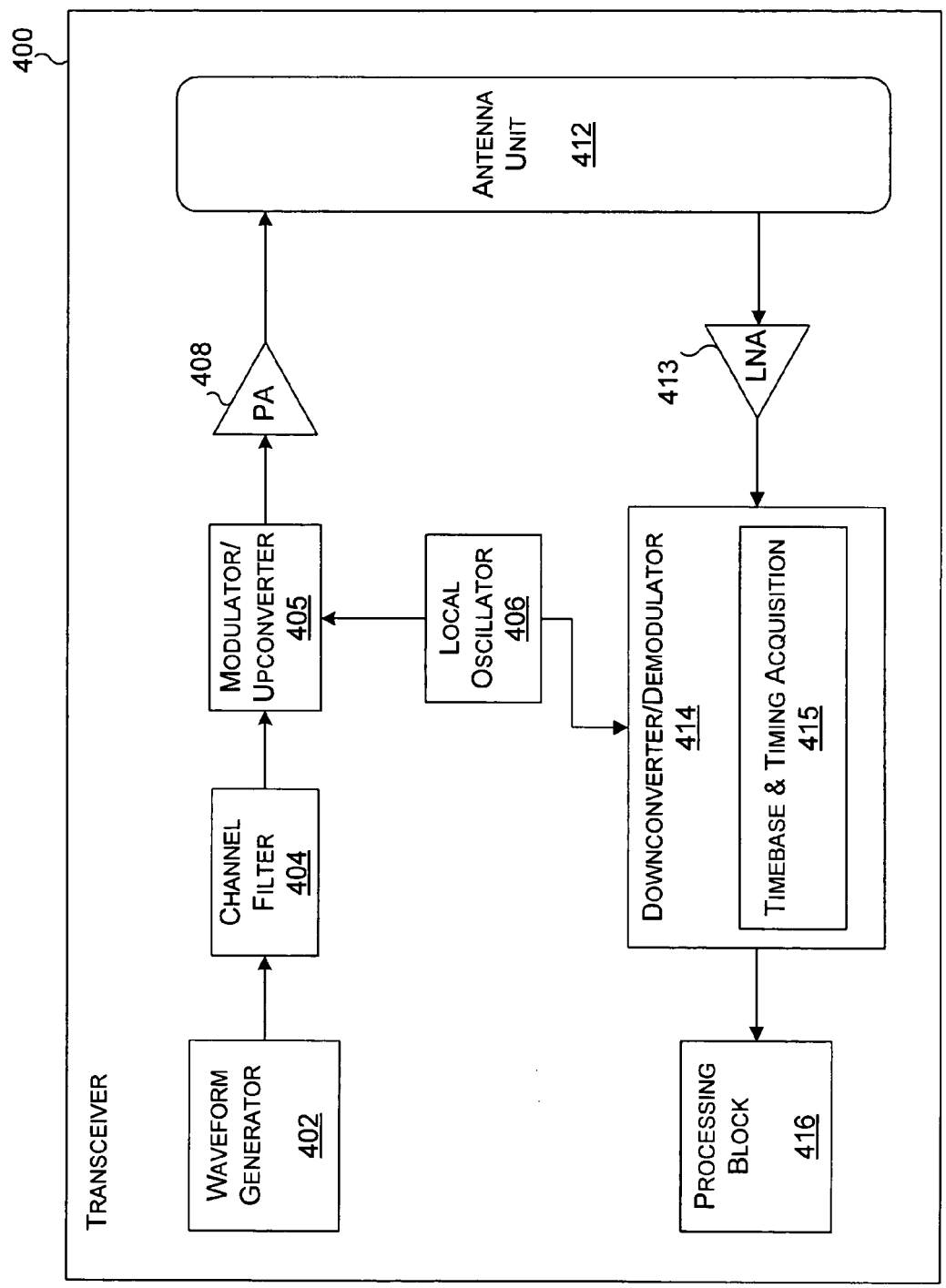
FIG. 4 is a block diagram illustrating a transceiver that can be used in an RFID reader such as the reader shown in FIG. 1.

FIG. 4 illustrates a portion of a transceiver 400 capable of determining a timebase and timing of a received signal, according to one embodiment. In this embodiment, transceiver 400 includes a waveform generator 402, a channel filter 404, modulator/upconverter 405 (also referred to as modulator 405), a local oscillator (LO) 406, a power amplifier (PA) 408, an antenna unit 412, a low noise amplifier (LNA) 413, and a downconverter/demodulator (also referred to as demodulator) 414. In accordance with embodiments of the present invention, demodulator 414 includes a timebase and timing acquisition component 415. In some other embodiments, some of the components may be omitted and/or additional components added. For example, a coupler may be added between PA 408 and antenna unit 412 to provide a LO signal to downconverter/demodulator 414 instead of a direct connection from LO 406, or LNA 413 may be omitted. Further, although this embodiment of transceiver 400 implements a direct-conversion receiver, other embodiments may include an intermediate frequency (IF) stage.

In operation during a transmit mode, waveform generator 402 provides a digital signal corresponding to digital data to be transmitted. Channel filter 404 filters the digital data signal so that the filtered signal's spectrum will be contained in the intended channel's frequency band. Modulator 405 then receives the filtered analog data signal and modulates the data onto a carrier signal having a frequency that is centered in the channel. In this exemplary embodiment, the carrier signal is provided from LO 406.

PA 408 then receives the output signal from modulator 405 and amplifies it for broadcast via antenna unit 412. In some embodiments, antenna unit 412 includes a duplexer (e.g., directional coupler, circulator, etc.) so that a single antenna can be used for both transmitting and receiving RF signals. In other embodiments, antenna unit 412 may include separate transmit and receive antennas.

In operation during a receive mode, this embodiment of transceiver 400 transmits an unmodulated or continuous wave (CW) carrier signal to provide a carrier signal that a tag (e.g., tag 120 in FIG. 1) may modulate (i.e. backscatter) and from which the tag may scavenge power. In this receive mode, demodulator 414 receives a backscatter signal via antenna unit 412 and LNA 413. In one embodiment, demodulator 414 forms a direct conversion receiver to directly obtain baseband I and Q components signals from the received backscatter signal. In this embodiment, demodulator 414 includes timebase and timing acquisition component 415 to determine a timebase and timing of the received backscatter signal. In accordance with various embodiments, timebase and timing acquisition component 415 can select and/or adapt a matched filter used in receiving the backscatter signal that is optimal for the timebase of the backscatter signal. Embodiments of timebase and timing acquisition component 415 are described in more detail below.

Figure 5:
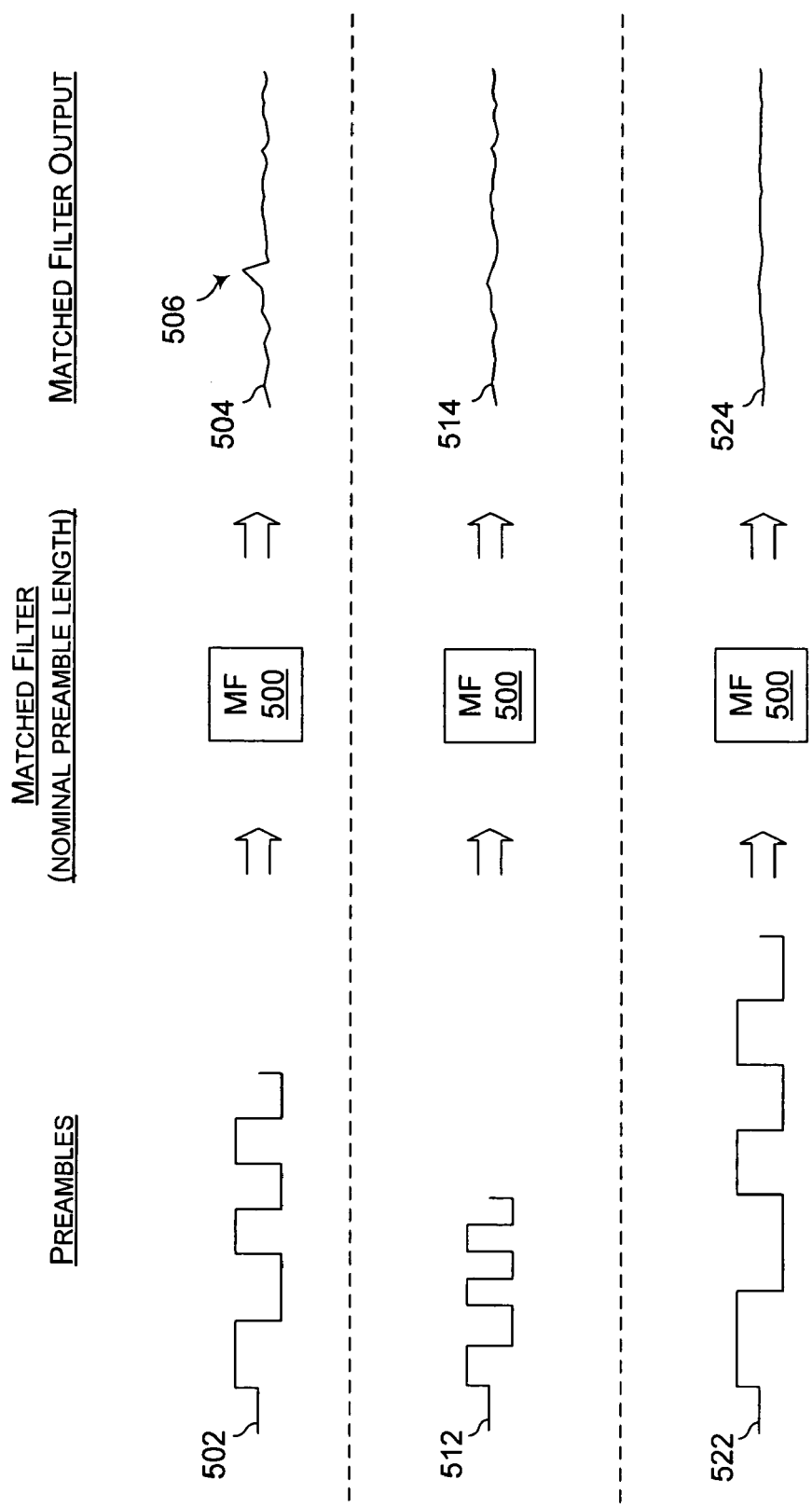
FIG. 5 is a diagram illustrating waveforms of preambles and corresponding output signals of a matched filter receiving the preambles.

FIG. 5 shows three preamble waveforms and corresponding output signals of a single matched filter 500 receiving the preamble, to illustrate the effect of the timebase of the preamble signal on the output of the matched filter.

In this example, matched filter 500 is matched for a known preamble (i.e., a known sequence of bits to indicate the start of message from a tag) of nominal length (i.e., with a known timebase), and a preamble signal 502 has the known preamble and is transmitted at the nominal timebase. Thus, when received and filtered by matched filter 500 after being transmitted (can be a noisy environment), matched filter 500 outputs a signal 504 having a peak 506 corresponding to the end of the preamble signal. The timing of the backscatter signal containing preamble signal 502 can then be derived from the time at which peak 506 occurs.

In contrast, the timebase of a preamble signal 512 is relatively fast compared to that of preamble signal 502 and, thus, has a relatively short length. When received and filtered by matched filter 500 after transmission in a noisy environment, matched filter 500 outputs a signal 514 with no discernible peak. Therefore, in this example the timing of this backscatter signal is difficult to determine. A similar result may occur when a matched filter (not shown) is used for receiving data portions of backscatter signals.

Similarly, the timebase of a preamble signal 522 is relatively slow compared to that of preamble signal 502 and, thus, has a relatively long length. When received and filtered by matched filter 500 after transmission in a noisy environment, matched filter 500 outputs a signal 524 with no discernible peak. Again, the timing of this backscatter signal is difficult to determine. A similar result may occur when a matched filter (not shown) is used for receiving data portions of backscatter signals.

Figure 6:
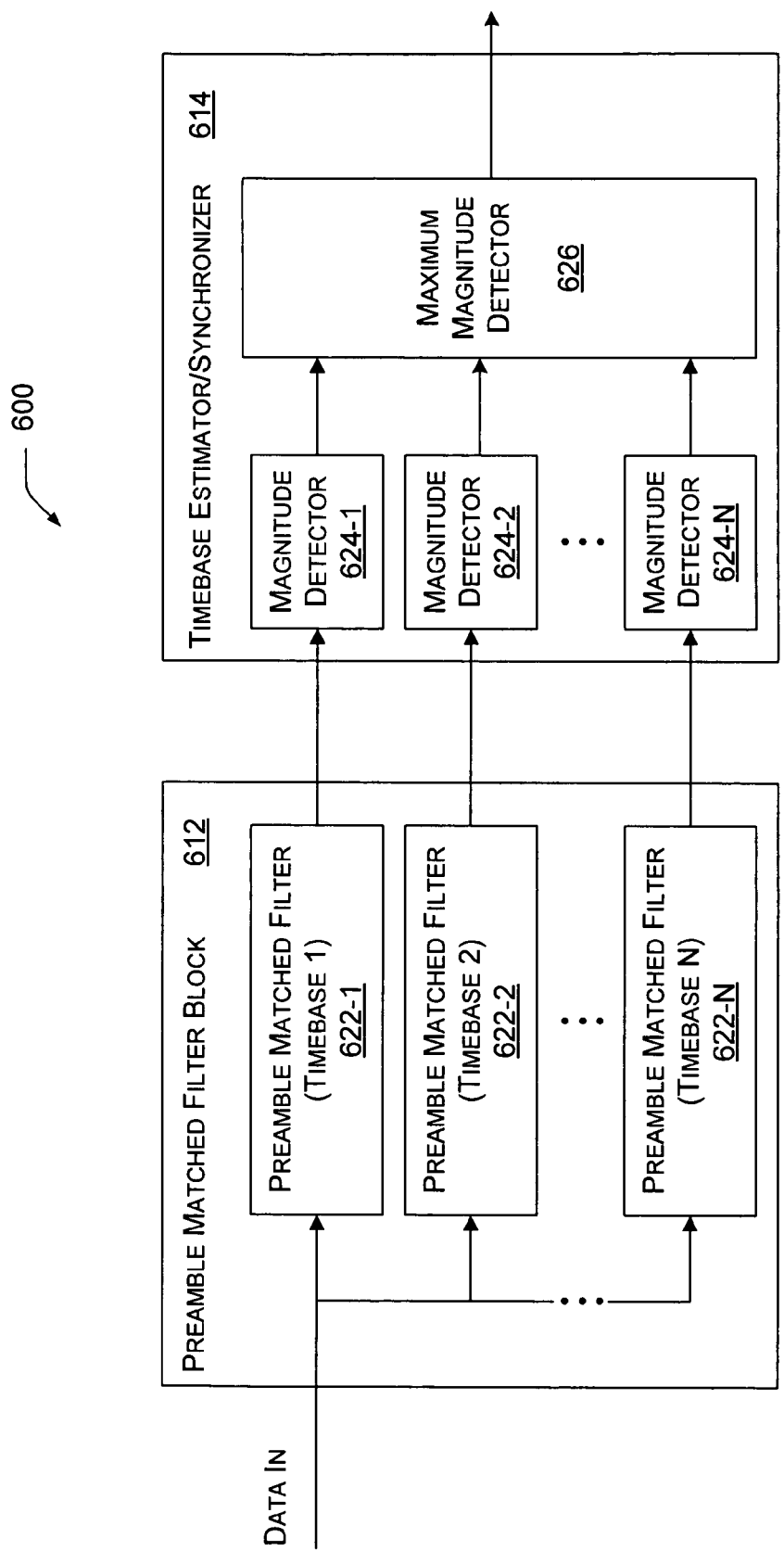
FIG. 6 is a block diagram illustrating a timebase and timing acquisition component that can be used in a demodulator such as the downconverter/demodulator shown in FIG. 4.

FIG. 6 illustrates a timebase and timing acquisition component 600 that can be used in a demodulator such as downconverter/demodulator 414 (FIG. 4), according to one embodiment of the present invention. In this embodiment, timebase and timing acquisition component 600 includes a preamble matched filter block 612 and a timebase estimator/synchronizer 614.

In this embodiment, preamble matched filter block 612 includes preamble matched filters 622-1 through 622-N. Preamble matched filters 622-1 through 622-N are all matched for the same preamble bit sequence, but correspond to timebase 1 through timebase N, respectively. Preamble matched filters 622-1 through 622-N are connected or coupled to receive a down-converted backscatter signal.

In this embodiment, timebase estimator/synchronizer 614 includes magnitude detectors 624-1 through 624-N, and a maximum magnitude detector 626. Magnitude detectors 624-1 through 624-N are respectively connected or coupled to receive output signals from preamble matched filters 622-1 through 622-N. Maximum magnitude detector 626 is connected or coupled to receive output signals from magnitude detectors 624-1 through 624-N.

In some applications, the tags in an RFID system may have timebases that may vary from the nominal timebase. As illustrated in FIG. 4, if the timebase of the preamble signal does not match that of the preamble matched filter, then the matched filter output may not have a clearly discernible peak and, thus, the timing of the backscatter signal may be difficult to determine.

However, in this embodiment of timebase and timing acquisition component 600, preamble matched filter block 612 includes N preamble matched filters to "cover" a range of timebases. In some embodiments, the range of timebases can be selected to match the expected variation in timebases of the tags. For example, the expected range can be determined empirically by testing a sample of the tags used in the system. In some embodiments, the timebases for the preamble matched filters can be uniformly distributed over the expected range in some embodiments. In other embodiments, the timebases can be distributed non-uniformly (e.g., having a distribution matching the expected distribution of tag timebases).

In operation, the preamble signal is provided to preamble matched filter block 612, which distributes the received preamble signal to preamble matched filters 622-1 through 622-N. In one embodiment, the preamble signal received by each preamble matched filter has substantially the same energy.

Preamble matched filters 622-1 through 622-N then filter their received preamble signals. The output signals from preamble matched filters 622-1 through 622-N are then provided to timebase estimator/synchronizer 614.

In timebase estimator/synchronizer 614, magnitude detectors 624-1 through 624-N receive the output signals of preamble matched filters 622-1 through 622-N, respectively. Magnitude detectors 624-1 through 624-N each output a signal that indicates the maximum peak detected in its received matched filter output signal. Maximum magnitude detector 626 then determines which of magnitude detectors 624-1 through 624-N detected the maximum with the highest magnitude. In accordance with this embodiment, each of magnitude detectors 624-1 through 624-N are associated with a particular timebase via its corresponding preamble matched filter of preamble matched filters 622-1 through 622-N. Consequently, the timebase of the preamble signal can be approximated by the timebase associated with the magnitude detector that detected the largest peak. In this embodiment, the output signal of maximum magnitude detector 626 indicates the approximate timebase and timing or time sync of the received backscatter signal. With this timebase and time sync information, an appropriate matched filter can then be selected (or configured) to receive and process data portion(s) of the received backscatter signal.

Figure 7:
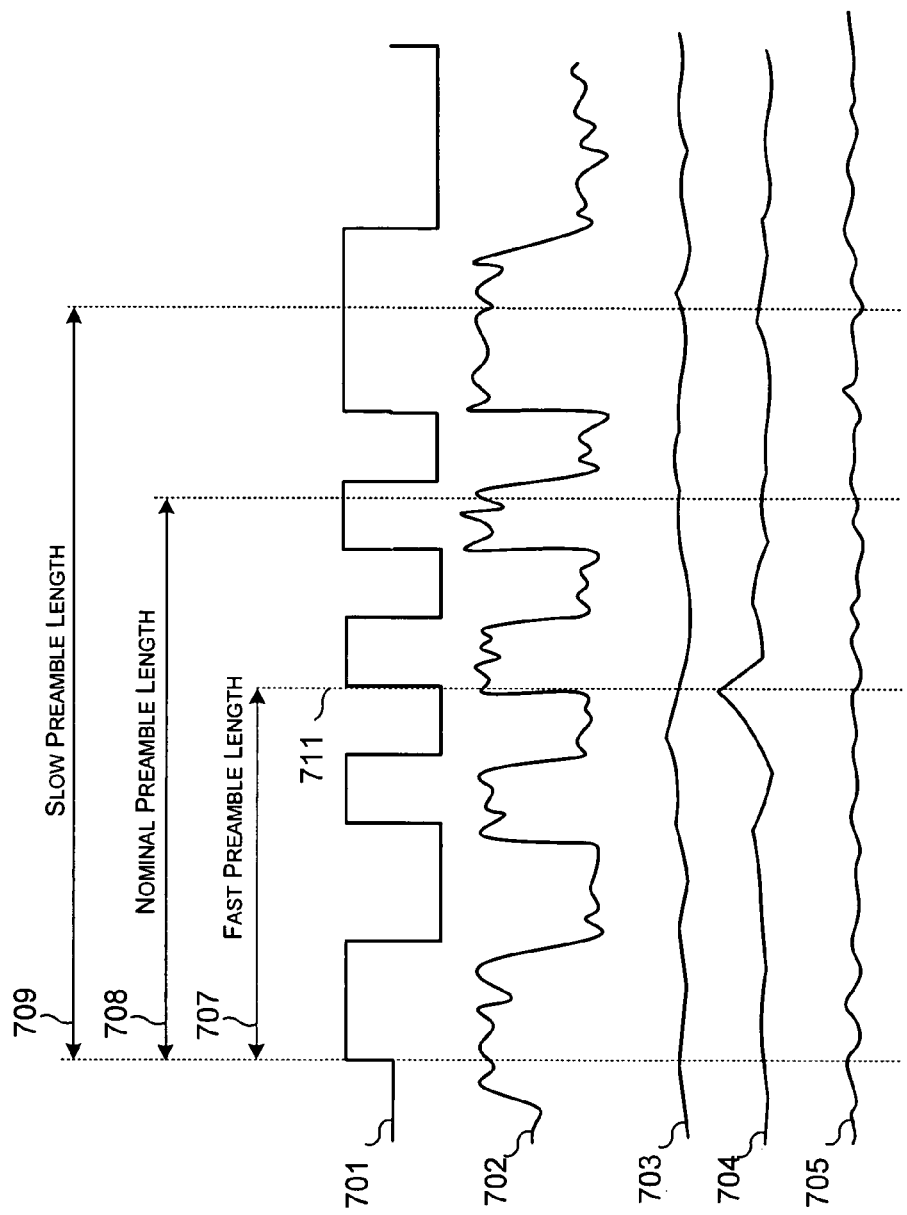
FIG. 7 is a diagram illustrating waveforms of an ideal preamble, received preamble, and corresponding output signals of the matched filter block shown in FIG. 6.

FIG. 7 illustrates exemplary waveforms of a transmitted signal 701, a received signal 702, and three output signals 703-705 of matched filter block 612 (FIG. 6) that result from filtering the received signal. These waveforms illustrate how the timing or time sync of transmitted preamble waveform 701 can be determined.

In this example, transmitted signal 701 has a relatively fast timebase and a preamble consisting of a relatively large pulse followed by the relatively short pulse, resulting in a relatively short preamble length 707. The subsequent pulses (two short pulses and a long pulse) visible in FIG. 7 are part of the data portion of transmitted signal 701. For comparison purposes, a nominal preamble length 708 (i.e., corresponding to a nominal timebase) and a long preamble length 709 (i.e., corresponding to a relatively slow timebase) are also shown in FIG. 7 without showing the corresponding preamble signals that would have such preamble lengths.

In this example, matched filter output signals 703-705 represents the output signals of a matched filter for a nominal timebase, a relatively fast timebase and a relatively slow timebase, respectively. As previously described, when the timebase associated with a preamble matched filter does not match the timebase of the received preamble signal, the matched filter's output signal may not have a clear sharp peak. This scenario is illustrated by output signals 703 and 705 (respectively generated by matched filters for nominal and slow timebases), which have relatively small, spread peaks because transmitted signal 701 has a relatively fast timebase. In contrast, output signal 704 (generated by a matched filter for a relatively fast timebase) has a relatively large sharp peak that occurs at the end of short preamble length 707, as indicated by a dashed vertical line 711 that is aligned with the end of the short preamble length and the center of the peak of output signal 704. Thus, the timebase of transmitted signal 701 can be derived from the time between the start of the preamble and the center of the peak.

Figure 8:
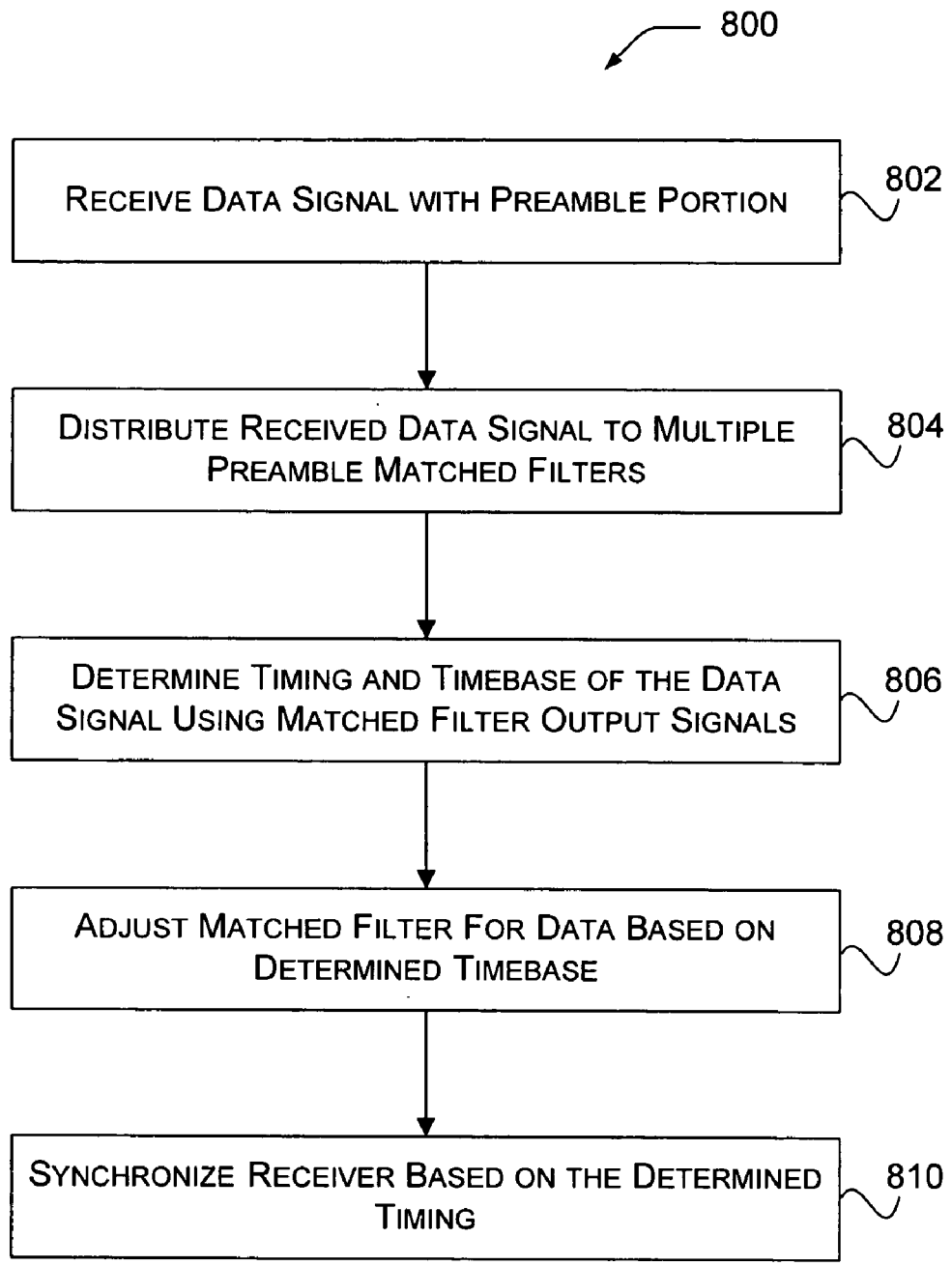
FIG. 8 is a flow diagram illustrating operational flow in determining a timebase and timing of a received signal.

FIG. 8 illustrates operational flow 800 in determining a timebase and timing of a received signal, according to one embodiment of the present invention. Operational flow 800 may be performed in any suitable environment. For example, operational flow 800 may be performed by system 600 of FIG. 6 and, therefore, the description of operational flow 800 may refer to at least one of the components of FIG. 6. However, any such reference to a component of FIG. 6 is for descriptive purposes only, and it is to be understood that the implementation of FIG. 6 is a non-limiting environment for operational flow 800.

At a block 802, a signal having a preamble portion and a data portion are received. In one embodiment, the signal is a backscatter signal from a RFID tag, such as described above in conjunction with FIGS. 6 and 7. Operational flow can then proceed to a block 804.

At block 804, the received signal is distributed to multiple preamble matched filters. The preamble matched filters are matched for the same known sequence of bits that form the preamble portion, but have different timebases. In one embodiment, the preamble matched filters are implemented so as to cover an expected range of timebases, such as preamble matched filters 622-1 through 622-N (FIG. 6). Operational flow can then proceed to a block 806.

At block 806, the timing and timebase of the received signal are determined. In one embodiment, the timing and timebase are determined using multiple preamble matched filters that are matched for different timebases. As previously mentioned, the preamble matched filters may match timebases that cover the expected range of timebases. The timebase of the received signal can then be approximated by the timebase of the matched filter with the largest peak in its output signal. The timing or time sync can be determined using the time period measured from the start of the received preamble portion to the peak of the output signal having the largest peak in its output signal. Operational flow can then proceed to a block 808.

At block 808, a matched filter for receiving a data portion of the received signal is selected or adjusted based on the timebase determined at block 806. In one embodiment, multiple data matched filters having timebases corresponding to those of the multiple preamble matched filters (described above in conjunction with block 806) are used to receive the data portion of the received signal. More particularly, the data matched filter of the multiple data matched filters that has a timebase that best matches the timebase determined at block 808 can be selected to receive the data portion of the data signal. For example, the output signal of maximum magnitude detector 626 (FIG. 6) can be used as a control signal to a de-multiplexer (not shown) that switches or routes the data portion of the received signal to the appropriate data matched filter. In other embodiments, a configurable data matched filter is configured to have the desired timebase (i.e., the timebase determined at block 806) and is used to receive the data portion of the received signal. Operational flow can then proceed to a block 810.

At block 810, a receiver (including the receiving portion of a transceiver) is synchronized with the received data signal based on the time sync determined at block 806. In one embodiment, the receiver is the receiver portion of transceiver 400 (FIG. 4) that contains timebase and timing acquisition component 415 (FIG. 4).

Although the above operational flow is described sequentially, in other embodiments some operations may be combined with other operations, omitted, or performed in different orders, or performed concurrently with other operations.

Figure 9:
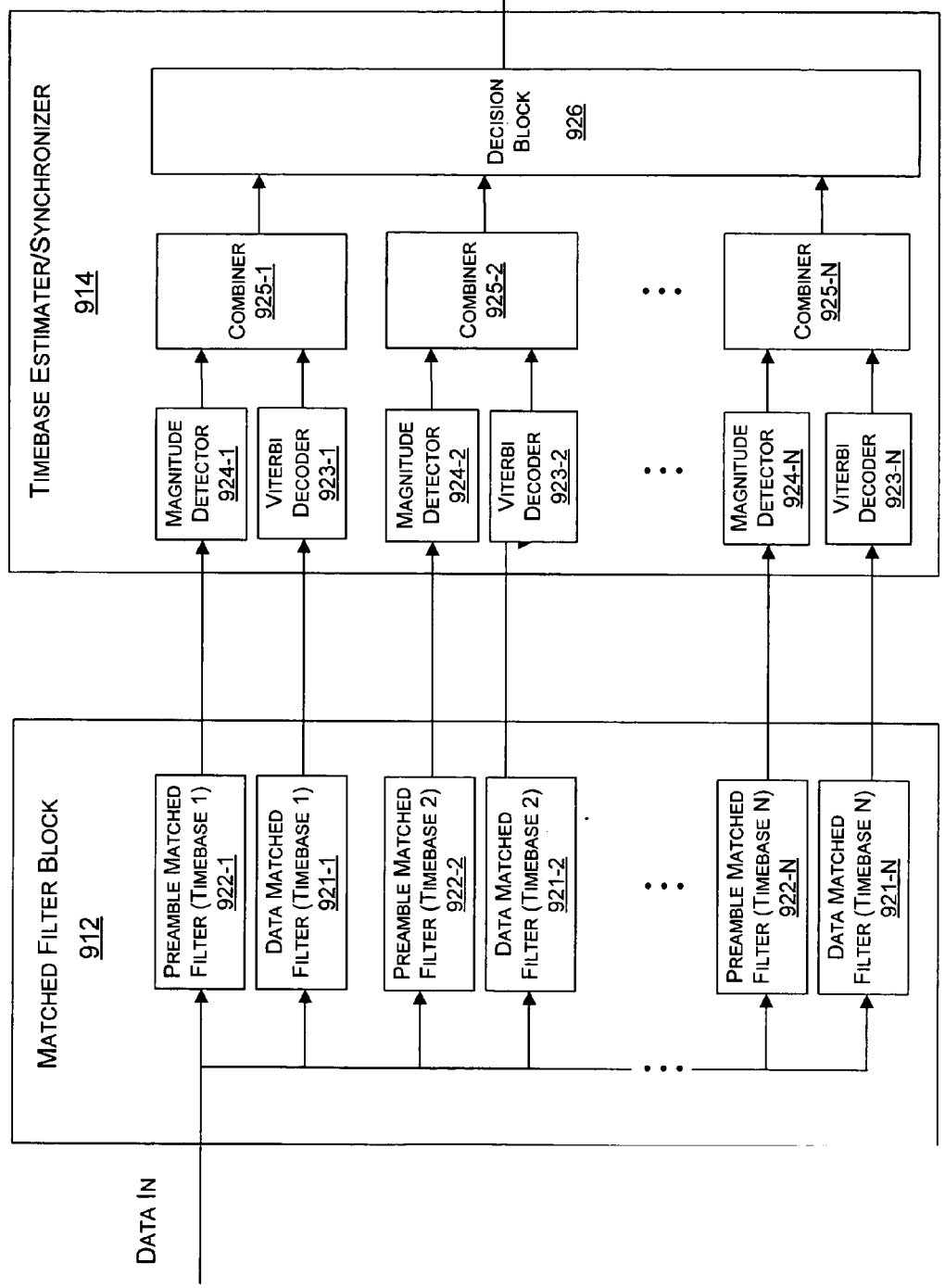
FIG. 9 is a block diagram illustrating another timebase and timing acquisition component that can be used in a demodulator such as the downconverter/demodulator shown in FIG. 4.

FIG. 9 illustrates a timebase and timing acquisition component 900 that can be used in a demodulator such as the downconverter/demodulator shown in FIG. 4, according to one embodiment of the present invention. This embodiment of timebase and timing acquisition component 900 is similar to timebase and timing acquisition component 600 (FIG. 6), but with the addition of components to add a Viterbi decoder pathmetric to aid in timebase determination. This embodiment can be advantageously used in applications in which the transmitted signal has memory and the preamble is relatively short.

In this embodiment, timebase and timing acquisition component 900 includes a matched filter block 912 and a timebase estimator/synchronizer 914. This embodiment of preamble matched filter block 912 includes data matched filters 921-1 through 921-N and preamble matched filters 922-1 through 922-N. Data matched filters 921-1 through 921-N are all matched for the same data bit sequence, but correspond to timebase 1 through timebase N, respectively. Similarly, preamble matched filters 922-1 through 922-N are all matched for the same preamble sequence, but correspond to timebase 1 through timebase N. Data matched filters 921-1 through 921-N and preamble matched filters 922-1 through 922-N are connected or coupled to receive a down-converted backscatter signal.

In this embodiment, timebase estimator/synchronizer 914 includes: Viterbi decoders 923-1 through 923-N; magnitude detectors 924-1 through 924-N$_{[LEL6]}$; combiners 925-1 through 925-N; and a decision block 926. Viterbi decoders 923-1 through 923-N are connected or coupled to receive output signals from data matched filters 921-1 through 921-N. Similarly, magnitude detectors 924-1 through 924-N are respectively connected or coupled to receive output signals from preamble matched filters 922-1 through 922-N. Combiner 925-1 is connected or coupled to receive output signals from magnitude detector 924-1 and Viterbi decoder 923-1; combiner 925-2 is connected or coupled to receive output signals from magnitude detector 924-2 and Viterbi decoder 923-2, and so on to combiner 925-N, which is connected or coupled to receive output signals from magnitude detector 924-N and Viterbi decoder 923-N. Decision block 926 is connected or coupled to receive output signals from combiners 925-1 through 925-N.

In one embodiment, Viterbi decoders 923-1 through 923-N are implemented as described in the cross-referenced U.S. patent application Ser. No. 10/861,073 entitled "Decoding With Memory in RFID System" by Aanand Esterberg, filed Jun. 4, 2004. Combiners 925-1 through 925-N, in one embodiment, each include a switch (not shown) and an adder or accumulator (not shown). In each combiner, the switch is controlled to route: (a) the output signal from the corresponding magnitude detector to the adder during reception of the preamble portion of the received signal; and (b) the output signal from the corresponding Viterbi decoder to the adder during reception of the data portion of the received signal.

In operation, data matched filters 921-1 through 921-N operate to filter the data portion of the received signal. For example, the data matched filters may all be matched to a single data symbol (e.g., a bit) used in the received signal, but with N different timebases. Preamble matched filters 922-1 through 922-N and magnitude detectors 924-1 through 924-N operate substantially as described above in conjunction with FIG. 6 for preamble matched filters 622-1 through 622-N and magnitude detectors 624-1 through 624-N. Viterbi decoders 923-1 through 923-N operate as described in aforementioned U.S. patent application Ser. No. 10/861,073 filed Jun. 4, 2004.

Combiner 925-1 through 925-N respectively combine the magnitudes generated by preamble matched filters 924-1 through 924-N with the pathmetrics generated by the corresponding Viterbi decoder of Viterbi decoders 923-1 through 923-N. As a result, each Viterbi decoder and its corresponding data matched filter from matched filter block 912 serves, in effect, to extend the preamble portion so that cross-correlation characteristics are improved. This concept is illustrated in FIG. 10.

Figure 10:
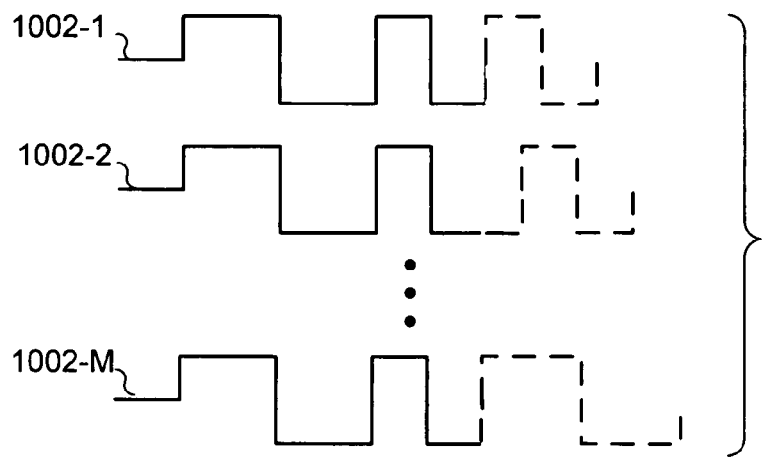
FIG. 10 is a diagram illustrating waveforms of a preamble and portion of a data signal for pairs of preamble and data matched filter corresponding to various timebases.
Figure 10:
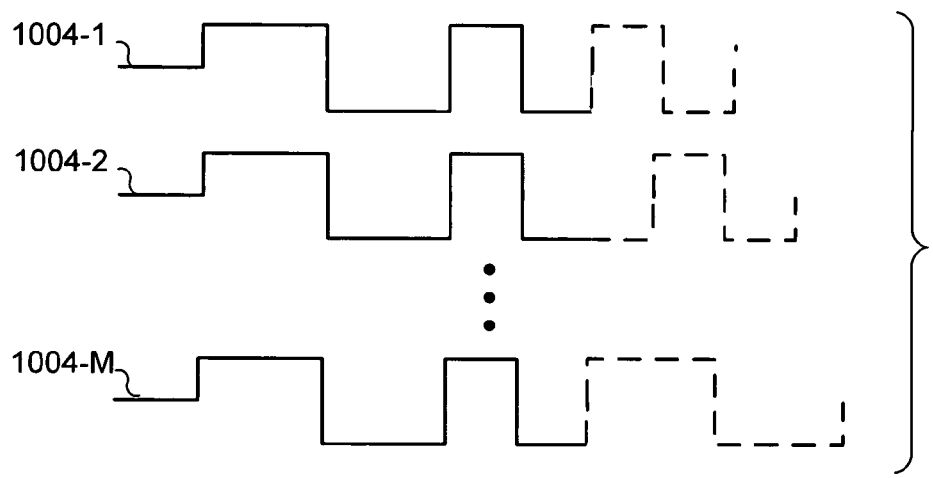
Figure 10:
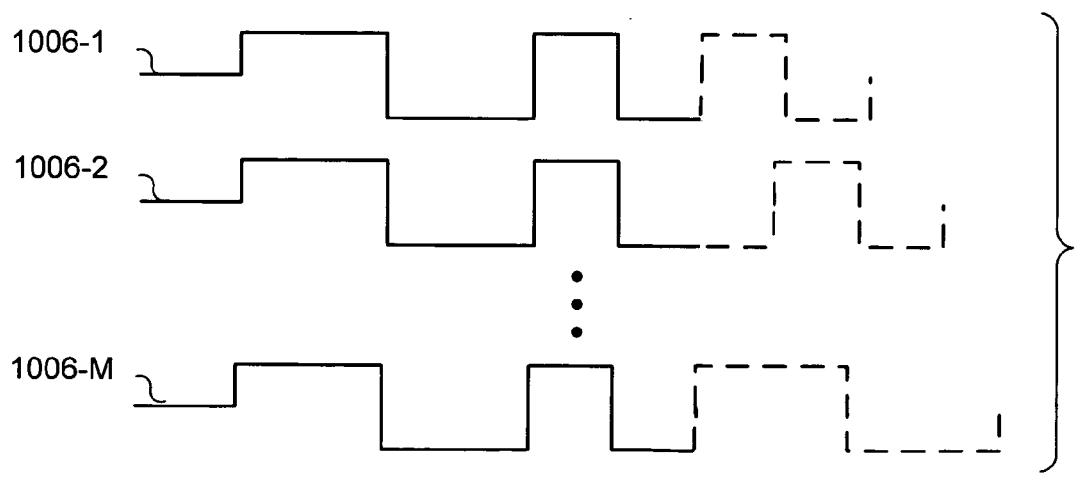

Turning now to FIG. 10, each of waveforms 1002-1 through 1002-M represent the "extended" preamble resulting from the actual preamble (shown in a solid line) and M possible data sequences (shown in dashed lines) for a particular timebase. For example, preamble and data matched filters 922-1 and 921-1 (FIG. 9) may be designed for this timebase. The M possible data sequences are generated by Viterbi decoder 923-1 (FIG. 9), which then determines which of the sequences is most likely represented by the received data portion and outputs a filtered version of it to combiner 925-1 (FIG. 9).

Similarly, waveforms 1004-1 through 1004-M represent the "extended" preamble resulting from the actual preamble and M possible data sequences for a slightly slower timebase. Preamble and matched filters 922-2 (FIG. 9) and 921-@ (FIG. 9) may be designed for this slightly slower timebase. Likewise, waveforms 1006-1 through 1006-M represent the "extended" preamble resulting from the actual preamble and M possible data sequences for an even slower timebase. Preamble and matched filters 922-N (FIG. 9) and 921-N (FIG. 9) may be designed for this even slower timebase.

Returning to FIG. 9, the output signal of the combiner (of combiners 925-1 through 925-N) associated with the timebase most closely matching the timebase of the received signal will generally have the largest peak.

Decision block 926 receives the output signals from combiners 925-1 through 925-N and determines which of these combiner output signals has the largest peak. The timebase is estimated as the timebase associated with the decision block having the largest peak. The timing or time sync of the received signal can be derived by determining the time duration between the start of the preamble and the center of the peak.

Figure 11:
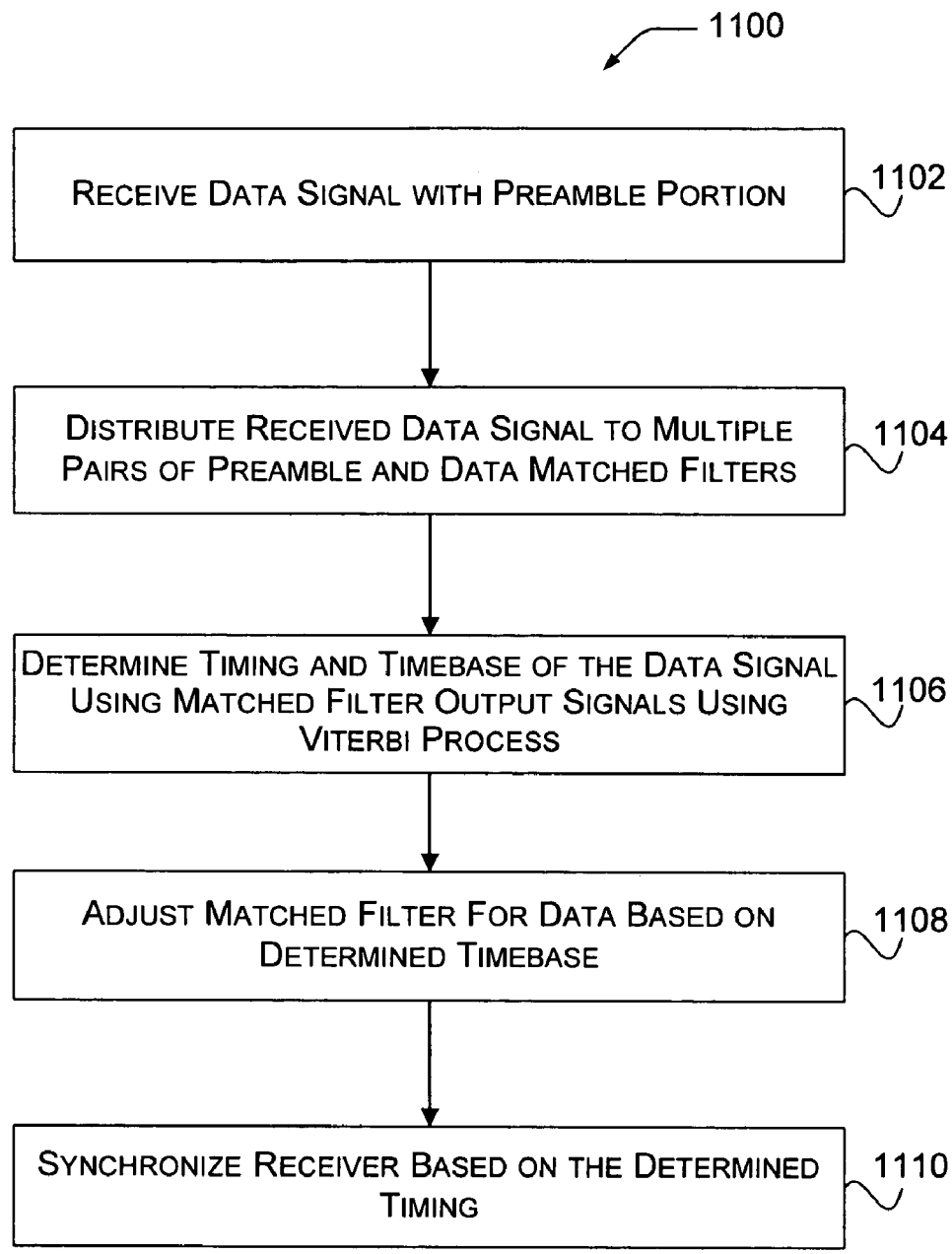
FIG. 11 is a flow diagram illustrating operational flow in determining a timebase and timing of a received signal using a Viterbi decoder.

FIG. 11 illustrates an operational flow 1100 in determining a timebase and timing of a received signal using a Viterbi decoder, according to one embodiment of the present invention. Operational flow 1100 may be performed in any suitable environment. For example, operational flow 1100 may be performed by system 900 of FIG. 9 and, therefore, the description of operational flow 1100 may refer to at least one of the components of FIG. 9. However, any such reference to a component of FIG. 9 is for descriptive purposes only, and it is to be understood that the implementation of FIG. 9 is a non-limiting environment for operational flow 1100.

At a block 1102, a signal having a preamble portion and a data portion is received. In one embodiment, the received signal is a backscatter signal from a RFID tag, such as described above in conjunction with FIGS. 6 and 7. Operational flow can then proceed to a block 1104.

At block 1104, the received signal is distributed to multiple pairs of preamble and data matched filters. The preamble matched filters are matched for the same known sequence of bits that form the preamble, but have different timebases. Similarly, the data matched filters are matched for the same know symbol(s), but with different timebases. For each pair, the preamble and data matched filters are matched to the same timebase. In one embodiment, the preamble and data matched filters are implemented so as to cover an expected range of timebases, such as preamble matched filters 922-1 through 922-N (FIG. 9) and data matched filters 921-1 through 921-N (FIG. 9). Operational flow can then proceed to a block 1106.

At block 1106, the timing and timebase of the received signal is determined. In one embodiment, the timing and timebase are determined using multiple preamble and data matched filters that are matched for different timebases. The preamble and data matched filters may match timebases so as to cover the expected range of timebases, as described above for preamble matched filters 922-1 through 922-N (FIG. 9) and data matched filters 921-1 through 921-N (FIG. 9). For each matched filter pair, the output signal of the preamble matched filter is received by a magnitude detector and the output signal of the data matched filter is received by a Viterbi decoder, such as described above in conjunction with FIG. 9. The output signals of the magnitude detector and the Viterbi decoder are then received by a combiner. The output signals of all of the combiners are then processed by decision block 926 to determine which output signal has the largest peak. The timebase of the received signal can then be approximated by the timebase associated with the combiner having the largest peak in its output signal. The timing or time sync can be determined using the time period measured from the start of the received preamble portion to the peak of the combiner output signal having the largest peak in its output signal. Operational flow can then proceed to a block 1108.

At block 1108, a matched filter for receiving a data portion of the data signal is selected or adjusted based on the timebase determined at block 1106. In one embodiment, the data matched filter of data matched filters 921-1 through 921-N that has a timebase that best matches the timebase determined at block 1108 can be selected. For example, the output signal of decision block 926 (FIG. 9) can be used as a control signal to a demultiplexer (not shown) that switches or routes the received signal to the appropriate data matched filter. In other embodiments, a configurable data matched filter is configured to have the desired timebase (i.e., the timebase determined at block 1106) and is used to receive the data portion of the data signal. Operational flow can then proceed to a block 1110.

At block 1110, a receiver (including the receiving portion of a transceiver) is synchronized with the received data signal based on the time sync determined at block 1106. In one embodiment, the receiver is the receiving portion of transceiver 400 (FIG. 4) that contains timebase and timing acquisition component 415 (FIG. 4).

Although the above operational flow is described sequentially, in other embodiments some operations may be combined with other operations, omitted, or performed in different orders, or performed concurrently with other operations.

Figure 12:
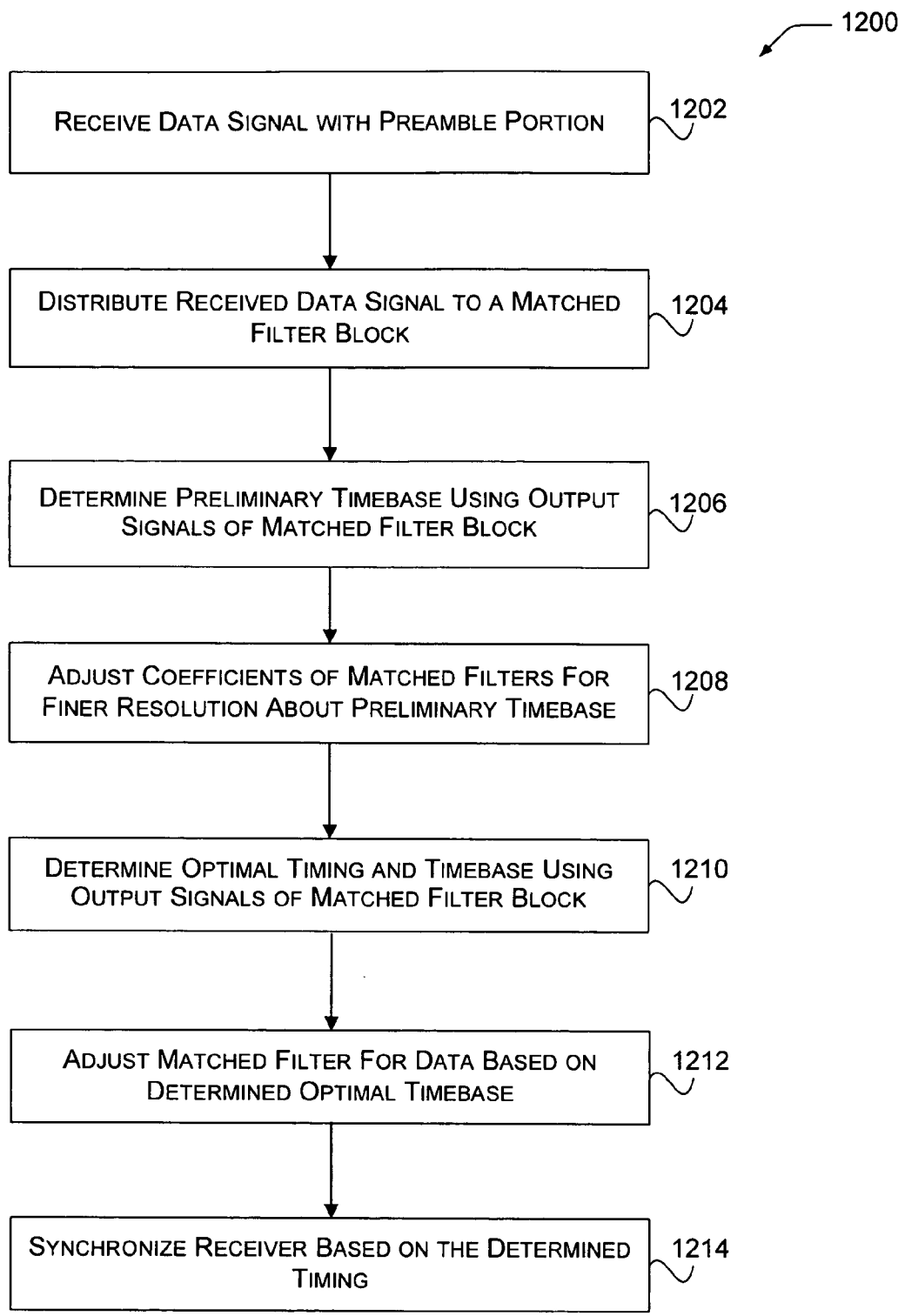
FIG. 12 is a flow diagram illustrating operational flow in determining a timebase and timing of a received signal using adaptive matched filters, all according to various embodiments.

FIG. 12 illustrates an operational flow 1200 in determining a timebase and timing of a received signal using adaptive matched filters, according to one embodiment of the present invention. Operational flow 1200 may be performed in any suitable environment. For example, operational flow 1200 may be performed by system 600 of FIG. 6 and, therefore, the description of operational flow 1200 may refer to at least one of the components of FIG. 6. However, any such reference to a component of FIG. 6 is for descriptive purposes only, and it is to be understood that the implementation of FIG. 6 is a non-limiting environment for operational flow 1200.

At a block 1202, a signal having a preamble portion and a data portion is received. In one embodiment, the received signal is a backscatter signal from a RFID tag, such as described above in conjunction with FIGS. 6 and 7. Operational flow can then proceed to a block 1204.

At block 1204, the received signal is distributed to multiple preamble matched filters. The preamble matched filters are matched for the same known sequence of bits that form the preamble, but have different timebases. In one embodiment, the preamble matched filters are implemented so as to cover an expected range of timebases, such as preamble matched filters 622-1 through 622-N (FIG. 6). In addition, preamble matched filters 622-1 through 622-N are configurable. For example, in one embodiment, the coefficients of preamble matched filter 622-1 through 622-N can be dynamically changed to change the timebase of the matched filtering. Operational flow can then proceed to a block 1206.

At block 1206, a preliminary timebase of the received data signal is determined. In one embodiment, the preliminary timebase is determined using the aforementioned multiple preamble matched filters, as described above for preamble matched filters 622-1 through 622-N (FIG. 6). The preliminary timebase of the received signal can then be approximated by the timebase of the matched filter with the largest peak in its output signal. Operational flow can then proceed to a block 1208.

At a block 1208, the preamble matched filters are re-configured so that the preliminary timebase (determined at block 1206) is centered in a new range that is smaller than the initial range covered by the matched filters. In addition, the timebases of the other preamble matched filters are then distributed about the preliminary timebase within the new range. In one embodiment, the remaining preamble matched filters are distributed uniformly about the preliminary timebase. The smaller range of timebases results in a finer resolution of timebases so that the timebase of the received signal can be more accurately determined. Operational flow can then proceed to a block 1210.

At block 1210, an optimal timing and timebase of the received signal are determined. In one embodiment, the timing and timebase are determined using the multiple preamble matched filters that were adjusted at block 1208. An optimal timebase of the received data signal can be approximated by the timebase of the reconfigured matched filter with the largest peak in its output signal when another preamble portion of a signal is received. The optimal timing or time sync can be determined using the time period measured from the start of the received preamble portion to the peak of the output signal having the largest peak in its output signal. Operational flow can then proceed to a block 1212.

At block 1212, a matched filter for receiving a data portion of the received signal is selected or adjusted based on the optimal timebase determined at block 1210. In one embodiment, multiple data matched filters having timebases corresponding to those of the multiple preamble matched filters (described above in conjunction with blocks 1210) are used to receive the data portion of the data signal. More particularly, the data matched filter of the multiple data matched filters that has a timebase that best matches the timebase determined at block 808 can be selected to receive the data portion of the data signal. Operational flow can then proceed to a block 1214.

At block 1214, a receiver (including the receiver portion of a transceiver) is synchronized with the received signal based on the optimal time sync determined at block 1210. In one embodiment, the receiver is the receiver portion of transceiver 400 (FIG. 4) that contains timebase and timing acquisition component 415 (FIG. 4).

Although the above operational flow is described sequentially, in other embodiments some operations may be combined with other operations, omitted, or performed in different orders, or performed concurrently with other operations.

In an alternative embodiment, dynamically configurable matched filters as described in operational flow 1200 can be combined with Viterbi decoders and combiners as described above in conjunction with FIG. 9.

In addition, embodiments of the present invention may be implemented not only with physical components (e.g., within a semiconductor chip), but also within machine-readable media. For example, the designs described above may be stored upon and/or embedded with machine readable media associated with a design tool used for designing semiconductor devices. Examples include designs defined/formatted in VHSIC Hardware Description Language (VHDL), Verilog language and SPICE language. Some netlist examples include: a behavior level netlist, a register transfer level (RTL) netlist, a gate level netlist, and a transistor level netlist. Machine readable media also include media having layout information such as a GDS-II file. Further, netlist files or other machine-readable media for semiconductor chip design may be used in a simulation to perform the methods of the embodiments disclosed herein.

Thus, embodiments of the present invention may be used as or to support a software program executed upon some form of processing core (e.g., a CPU of a computer) or otherwise implemented or realized upon or within a machine-readable medium. A machine-readable medium includes any mechanism for storing or transmitting information in a form readable by a machine (e.g. a computer). For example, a machine-readable medium can include read only memory (ROM), random access memory (RAM), magnetic disk storage media, optical storage media, flash memory devices, etc. In addition, machine-readable media can include propagated signals such as electrical, optical, acoustical or other form of propagated signal (e.g., carrier wave signals, infrared signals, digital signals, etc.)

One skilled in the relevant art may recognize, however, that the invention may be practiced without one or more of the specific details, or with other methods, resources, materials, etc. In other instances, well known structures, resources, or operations have not been shown or described in detail merely to avoid obscuring aspects of the invention.

While example embodiments and applications have been illustrated and described, it is to be understood that the invention is not limited to the precise configuration and resources described above. Various modifications, changes, and variations apparent to those skilled in the art may be made in the arrangement, operation, and details of the methods and systems of the present invention disclosed herein without departing from the scope of the claimed invention.

What is claimed is:

1. A method for using a Radio Frequency Identification (RFID) reader comprising:
   receiving a RFID tag signal at the RFID reader, wherein the RFID tag signal has a preamble portion;
   filtering the signal using a plurality of preamble matched filters corresponding to a first plurality of timebases, to form a first plurality of output signals; and
   determining a first timebase of the signal using the first plurality of output signals.

2. The method of claim 1, further comprising receiving a data portion of the signal using a data matched filter, wherein the data matched filter corresponds to the first timebase.

3. The method of claim 1, wherein determining the first timebase further comprises determining the first timebase in response to a determination of which output signal of the plurality of first output signals had a maximum peak magnitude, wherein the first timebase is derived from the corresponding timebase of the matched filter that outputted the output signal with the maximum peak magnitude.

4. The method of claim 1 further comprising synchronizing a receiver with the signal in response to detection of a maximum peak of the first plurality of output signals.

5. The method of claim 1 further comprising:
   configuring the plurality of preamble matched filters to correspond to a second plurality of timebases;
   filtering a second preamble portion using the configured plurality of preamble matched filters to form a second plurality of output signals;
   determining a second timebase of the received data signal from the second plurality of output signals; and
   receiving a data portion of the data signal using a data matched filter, wherein the data matched filter corresponds to the second timebase.

6. The method of claim 1, further comprising filtering a data portion of the signal using a plurality of data matched filters corresponding to the first plurality of timebases to form a third plurality of output signals; wherein the first timebase is determined using the first and third plurality of output signals.

7. The method of claim 6, wherein a Viterbi-based process is used to determine the first timebase.

8. The method of claim 1, wherein the signal comprises a backscatter signal from a RFID tag.

9. A RFID reader for determining a timebase of a signal received from an RFID tag, comprising:
   means for filtering the received signal having a preamble portion by a plurality of preamble matched filters;
   means for forming a first plurality of output signals corresponding to a first plurality of timebases; and
   means for determining a first timebase of the received signal using the first plurality of output signals.

10. The system of claim 9, wherein the first timebase is from determination of a matched filter that outputted an output signal of the first plurality of output signals with a maximum peak magnitude.

11. The system of claim 9 further comprising means for synchronizing a receiver with the received signal in response to detection of a maximum peak of the plurality of output signals.

12. The system of claim 9 farther comprising means for configuring the means for filtering to form a second plurality of output signals corresponding to a second plurality of timebases.

13. The system of claim 9 farther comprising means for filtering a data portion of the signal to form a third plurality of output signals corresponding to the first plurality of timebases; wherein the first timebase is determined using the first and third plurality of output signals.

14. A RFID reader system for determining a timebase of a received RFID Tag signal, the system comprising:
   a first plurality of preamble matched filters, corresponding to a first plurality of timebases, to receive a preamble portion of a signal from a radio frequency identification (RFID) tag; and
   a timebase unit to determine a timebase of the signal from a first plurality of output signals of the first plurality of preamble matched filters.

15. The system of claim 14, wherein the timebase unit is to determine which output signal of the first plurality of output signals had a maximum peak magnitude, wherein the first timebase is derived from the corresponding timebase of the matched filter that outputted the output signal with the maximum peak magnitude.

16. The system of claim 14, wherein the timebase unit is further to synchronize a receiver with the signal in response to a detection of a maximum peak of the first plurality of output signals.

17. The system of claim 14, wherein the timebase unit is further to configure the first plurality of matched filters to form a second plurality of output signals corresponding to a second plurality of timebases.

18. The system of claim 14, wherein the timebase unit further comprises a second plurality of matched filters to filter a data portion of the signal to form a third plurality of output signals corresponding to the first plurality of timebases; wherein the timebase unit determines the first timebase using the first and third plurality of output signals.

19. The system of claim 18, wherein the timebase unit uses a Viterbi-based process to determine the first timebase.

20. A computer-readable medium having stored thereon a design of a circuit according to claim 14

* * * * *